(12) United States Patent
Sasaki

(10) Patent No.: US 7,640,393 B2
(45) Date of Patent: Dec. 29, 2009

(54) SIGNAL REPRODUCING DEVICE

(75) Inventor: Tsutomu Sasaki, Osaka (JP)

(73) Assignees: Sanyo Electric Co., Ltd., Moriguchi-shi (JP); Sanyo Technosound Co., Ltd., Daito-shi (JP)

( * ) Notice: Subject to any disclaimer, the term of this patent is extended or adjusted under 35 U.S.C. 154(b) by 200 days.

(21) Appl. No.: 11/201,096

(22) Filed: Aug. 11, 2005

(65) Prior Publication Data
US 2006/0036342 A1 Feb. 16, 2006

(30) Foreign Application Priority Data
Aug. 13, 2004 (JP) ............... 2004-235909

(51) Int. Cl.
*G06F 12/00* (2006.01)
*G06F 13/00* (2006.01)
*G06F 13/28* (2006.01)

(52) U.S. Cl. ....................... 711/112; 711/141
(58) Field of Classification Search ............... 711/112, 711/12, 141
See application file for complete search history.

(56) References Cited

FOREIGN PATENT DOCUMENTS

| JP | 06-275054 A | 9/1994 |
| JP | 8-195031 | 7/1996 |
| JP | 11-203051 A | 7/1999 |
| JP | 2003-132629 A | 5/2003 |

OTHER PUBLICATIONS

Richard Menta; "Rio's New 20GB Jukebox Player"; Jan. 14, 2002; pp. 1-3 http://www.mp3newswire.net/stories/2002/rioriot.html.*
Sonic blue; "Rio Riot Digital Audio Player Users Guide"; First Edition; 2001; pp. 1, 6, and 30; http://www.digitalnetworksna.com/support/rio/downloads/rioriot/rioriot_guide_001.pdf.*
Derwent, Account No. 2001-474100, Derwent Week: 200728, Yang J. D., KR 2001010778 A, Feb. 16, 2001, pp. 2.*
Isaac Richards, "Myth TV", Sep. 9, 2002, pp. 6 http://web.archive.org/web/20020923043913/http://mythtv.org/.*
Pokey, Classic MP3 CD Player, Jan. 7, 2001, pp. 1-3, http://everything2.com/e2node/Classic%2520MP3%2520CD%2520Player.*
Jerv, "On a Portable CD Player, What Does "30-Second Anti Skip" Do And How Does It Work", Feb. 1, 2004, pp. 1-5, http://www.answerbag.com/q view/2453.*
Japanese Office Action dated Jul. 28, 2009, issued in corresponding Japanese patent application No. 2004-235909.

* cited by examiner

*Primary Examiner*—Matt Kim
*Assistant Examiner*—Christopher D Birkhimer
(74) *Attorney, Agent, or Firm*—Westerman, Hattori, Daniels & Adrian, LLP

(57) ABSTRACT

A signal reproducing device of the present invention includes a signal storing device, a buffer memory, and a signal processing circuit. The buffer memory is concurrently provided with a first storing area for storing a head portion of a plurality of sequential signals and a second storing area for storing a remaining portion other than the head portion of one sequential signal. The signal processing circuit starts an operation, when a signal selecting manipulation is made, of reading out and reproducing a head portion of a selected sequential signal from the first storing area, during the operation, reads out a remaining portion of the selected sequential signal from the signal storing device for storage in the second storing area, and, after completion of reproduction of the head portion of the selected sequential signal, reads out and reproduces the remaining portion of the sequential signal from the second storing area.

6 Claims, 10 Drawing Sheets

REPRODUCTION ORDER

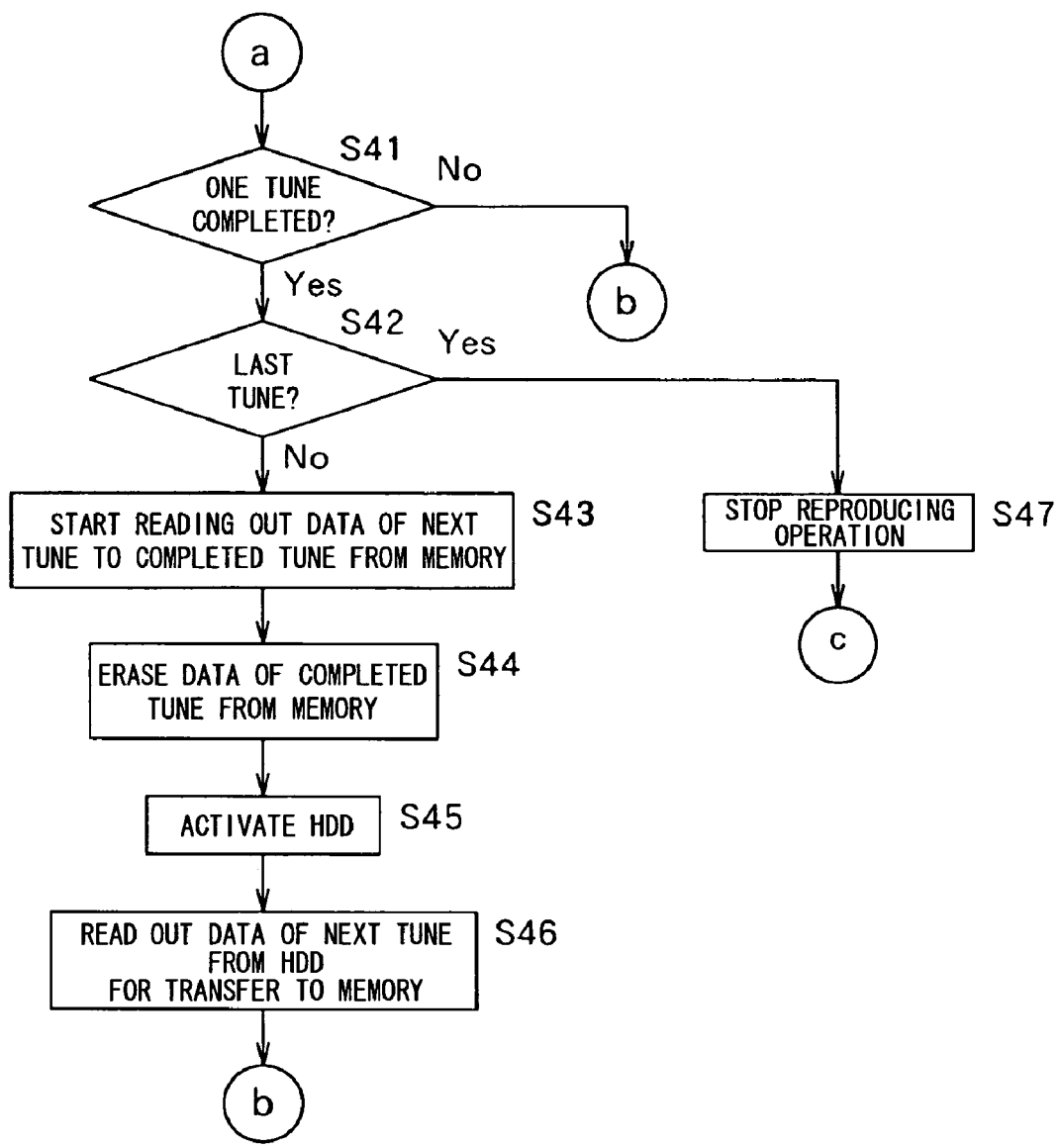

SIGNAL REPRODUCING DEVICE

The priority application Number 2004-235909 upon which this patent application is based is hereby incorporated by reference.

BACKGROUND OF THE INVENTION

1. Field of the Invention

The present invention relates to a signal reproducing device capable of reproducing a series of signals stored in a signal storing device such as a hard disk drive (HDD) device.

2. Description of Related Art

There has been conventionally known a hard disk player incorporating an HDD device and being capable of reproducing music data stored in the HDD device. In the hard disk player, when a reproduction key is depressed by a user, music data for one tune is read out from the HDD device. The music data read out is temporarily stored in a built-in memory, and thereafter read out from the memory. The music data read out is, after having a predetermined data processing applied thereto, fed to an incorporated speaker or a headphone connected thereto, and output from the speaker or the headphone as voice.

A skip manipulation during reproduction of music data enables the hard disk player to reproduce music data of a tune that lies ahead from a currently reproduced tune by a number in accordance with the number of times of the manipulation.

However, in the hard disk player, because the HDD device is set to a standby state after music data for one tune is read out from the HDD device until music data is next read out in order to reduce power consumption of the HDD device, when a skip manipulation is made with the HDD device set to the standby state, it is needed to activate the HDD device from the standby state to read out music data from the HDD device. This has been causing a problem of a long reproduction waiting time of approximately 10 seconds before reproduction of the music data.

Accordingly, there has been known a hard disk player incorporating a flash memory, for example, in which music data for a plurality of tunes is read out from an HDD device for temporary storage in the memory, and thereafter sequentially read out from the memory.

FIG. 8(a) to FIG. 8(c) show an example of changes in a data content in a flash memory during reproduction in such a hard disk player. In a description given below, music data for six tunes can be stored in the flash memory.

After the player is powered on, when a reproduction key is depressed, music data 1-6 for six tunes is read out from an HDD device, and stored in the flash memory as shown in FIG. 8(a). Then, an operation starts of reading out and reproducing music data 1 of a first tune from the memory. Thereafter, upon completion of reproduction of music data 1 of the first tune, an operation starts of reading out and reproducing music data 2 of a second tune from the flash memory as shown in FIG. 8(b). During this operation, music data 1 of the first tune is erased from the flash memory, and thereafter music data 7 of a seventh tune, which is not stored in the flash memory, is read out from the HDD device and stored in the memory. Further, upon completion of reproduction of music data 2 of the second tune, an operation starts of reading out and reproducing music data 3 of a third tune from the flash memory as shown in FIG. 8(c). During this operation, music data 2 of the second tune is erased from the flash memory, and thereafter music data 8 of an eighth tune is read out from the HDD device and stored in the memory.

As described above, because the flash memory always stores currently reproduced music data and music data for five tunes with a reproduction order later than that of the music data, it is unnecessary upon completion of reproduction of the music data to read out music data of a next tune from the HDD device. This prevents a reproduction waiting time before reproduction of the music data.

When a skip manipulation is made three times during reproduction of music data of the second tune, for example, with music data 2-7 of second to seventh tunes stored in the flash memory as shown in FIG. 8(b), it is possible to read out and reproduce music data 5 of a fifth tune from the flash memory without reading out the music data from the HDD device. This prevents a reproduction waiting time. However, when a skip manipulation is made six times or more with a condition described above, because music data of an eighth tune or later is not stored in the flash memory, reproduction is made by activating the HDD device, reading out the music data from the HDD device for storage in the flash memory, and thereafter reading out the data from the flash memory.

FIG. 9 and FIG. 10 show a reproduction procedure to be performed in the hard disk player with the flash memory. When the player is powered on, an inquiry is made as shown in step S31 as to whether or not a reproduction key is depressed by a user. When the answer is negative, the same inquiry is repeated in step S31. On the other hand, when the reproduction key is depressed by the user and the answer to step S31 is affirmative, step S32 follows to activate the HDD device. Thereafter in step S33, music data for six tunes is read out from the HDD device and transferred to the flash memory. Next in step S34, an operation starts of reading out and reproducing music data of a first tune from the flash memory. Thereafter in step S35, an inquiry is made as to whether or not a skip manipulation is made by the user. When the answer is negative, step S41 in FIG. 10 follows to inquire whether or not reproduction of music data for one tune is completed. When the answer is negative, step S35 in FIG. 9 follows again to inquire whether or not a skip manipulation is made.

Thereafter when reproduction of music data for one tune is completed, the answer to step S41 in FIG. 10 is affirmative, and step S42 follows to inquire whether or not the reproduction completed tune is a last tune stored in the HDD device. When the reproduction completed tune is not a last tune stored in the HDD device, step S43 follows to start an operation of reading out and reproducing music data of a next tune to the reproduction completed tune from the flash memory. Next in step S44, music data of the reproduction completed tune is erased from the flash memory. Subsequently in step S45, the HDD device is activated from a standby state. Thereafter in step S46, music data of a next tune to a tune with the latest reproduction order stored in the flash memory is read out from the HDD device and transferred to the flash memory. Then step S35 in FIG. 9 follows again to inquire whether or not a skip manipulation is made.

When a skip manipulation is made by the user with music data being reproduced as described above, the answer to step S35 is affirmative, and step S36 follows to inquire whether or not music data of a tune selected by the skip manipulation is stored in the flash memory. When the answer here is affirmative, step S40 follows to start an operation of reading out and reproducing the music data of the selected tune from the flash memory, followed by step S41 in FIG. 10.

On the other hand, when the answer to step S36 in FIG. 9 is negative, step S37 follows to erase music data from the flash memory. Next in step S38, the HDD device is activated from a standby state. Thereafter, step S39 follows to read out music data for six tunes including the selected tune from the HDD device for transfer to the flash memory. Then in step S40, an operation starts of reading out and reproducing the music data of the selected tune from the flash memory, followed by step S41 in FIG. 10.

Thereafter when reproduction of music data of a last tune stored in the HDD device is completed, the answer to step S42 is affirmative, and step S47 follows to stop reproducing operation. Then step S31 in FIG. 9 follows again to wait for the reproduction key to be depressed.

However, in the conventional hard disk player with the flash memory, the flash memory can store tunes in small number because whole music data for each tune is stored in the flash memory. This has been causing a problem that a reproduction waiting time can often occur due to failure for the flash memory to store music data of a tune selected by a skip manipulation as described above.

SUMMARY OF THE INVENTION

An object of the present invention is to provide a signal reproducing device capable of preventing a reproduction waiting time, when a signal selecting manipulation such as a skip manipulation is made, before reproduction of a sequential signal selected by the manipulation.

A signal reproducing device of the present invention comprises a signal storing device for storing a plurality of sequential signals, a buffer memory for storing the sequential signal read out from the signal storing device, and a signal processing circuit for reading out the sequential signal stored in the signal storing device from the device for temporary storage in the buffer memory, and thereafter reading out and reproducing the signal from the buffer memory. The buffer memory is concurrently provided with a first storing area for storing a head portion of the plurality of sequential signals and a second storing area for storing a whole or a remaining portion other than the head portion of at least one sequential signal, and the signal processing circuit comprises:

first signal processing means for, when a signal selecting manipulation is made with a head portion of a plurality of sequential signals stored in the first storing area of the buffer memory, reading out and reproducing a head portion of a selected sequential signal from the first storing area;

second signal processing means for, during operation of the first signal processing means, reading out a whole or a remaining portion other than the head portion of the selected sequential signal from the signal storing device for storage in the second storing area of the buffer memory; and third signal processing means for, after completion of the operation of the first signal processing means, reading out and reproducing the remaining portion of the selected sequential signal from the second storing area of the buffer memory.

The buffer memory of the signal reproducing device of the present invention is concurrently provided with a first storing area for storing a head portion of the plurality of sequential signals and a second storing area for storing a whole or a remaining portion other than the head portion of at least one sequential signal. Here, a data amount of a head portion of a sequential signal is set such that a time for reading out the head portion of the sequential signal from the buffer memory is longer than a time for reading out a whole or a remaining portion of the sequential signal from the signal storing device for storage in the buffer memory.

When a signal selecting manipulation is made by a user, an operation first starts of reading out and reproducing a head portion of a selected sequential signal from the first storing area of the buffer memory. Here, because the first storing area of the buffer memory only stores a head portion of sequential signals, a great number of sequential signals can have a head portion thereof stored in the area. Consequently, the head portion of the selected sequential signal is highly unlikely to fail to be stored. During reproducing operation of the head portion of the selected sequential signal, a whole or a remaining portion other than the head portion of the sequential signal is read out from the signal storing device and stored in the second storing area of the buffer memory. Thereafter, upon completion of reproduction of the head portion of the sequential signal, the remaining portion of the sequential signal is read out and reproduced from the second storing area of the buffer memory.

According to the signal reproducing device of the present invention, when a signal selecting manipulation is made, it is unnecessary to read out a head portion of a selected sequential signal from the signal storing device. This prevents a reproduction waiting time before reproduction of the sequential signal.

Specifically, the first storing area of the buffer memory stores a head portion of one or more sequential signals with a reproduction order earlier than that of a currently reproduced sequential signal, and a head portion of one or more sequential signals with a later reproduction order. According to the specific construction, in either case of a manipulation for selecting a sequential signal that has not yet been reproduced, or a manipulation for selecting a sequential signal that has already been reproduced, reproduction of the sequential signal starts without a reproduction waiting time.

Further specifically, the signal processing circuit comprises fourth signal processing means for, during operation of the third signal processing means, reading out a head portion of one or more sequential signals other than a sequential signal stored in the first storing area of the buffer memory from the signal storing device in accordance with the selected sequential signal for storage in the first storing area.

The specific construction can lower a possibility of failure for the first storing area of the buffer memory to store a selected sequential signal when a signal selecting manipulation is made.

Still further specifically, the signal processing circuit comprises:

fifth signal processing means for, upon completion of reproduction of one sequential signal, reading out and reproducing a head portion of one sequential signal with a reproduction order later than that of the completed sequential signal from the first storing area of the buffer memory;

sixth signal processing means for, during operation of the fifth signal processing means, reading out a whole or a remaining portion other than the head portion of the one sequential signal with the later reproduction order from the signal storing device for storage in the second storing area of the buffer memory;

seventh signal processing means for, after completion of the operation of the fifth signal processing means, reading out and reproducing the remaining portion of the one sequential signal with the later reproduction order from the second storing area of the buffer memory; and eighth signal processing means for, during operation of the seventh signal processing means, reading out a head portion of one sequential signal with a reproduction order later than that of a sequential signal stored in the first storing area of the buffer memory from the signal storing device for storage in the first storing area.

In the specific construction, upon completion of reproduction of one sequential signal, an operation first starts of reading out and reproducing a head portion of one sequential signal with a reproduction order later than that of the completed sequential signal from the first storing area of the buffer memory. During the reproducing operation, a whole or a remaining portion other than the head portion of the one sequential signal is read out from the signal storing device and stored in the second storing area of the buffer memory. Thereafter, upon completion of reproduction of the head portion of the sequential signal, an operation starts of reading out and reproducing the remaining portion of the sequential signal from the second storing area of the buffer memory. During the reproducing operation, a head portion of one sequential signal with a reproduction order later than that of a sequential signal stored in the first storing area of the buffer memory is read out from the signal storing device and stored in the first storing area.

According to the specific construction, upon completion of reproduction of one sequential signal, it is unnecessary to read out a head portion of a next sequential signal from the signal storing device. This prevents a reproduction waiting time before reproduction of the sequential signal.

Still further specifically, a skip reproduction is possible in which reproduction is made skipping a sequential signal from a currently reproduced sequential signal by a number in accordance with the number of times of a skip manipulation, and the signal processing circuit comprises ninth signal processing means for, whenever the number of times of a skip manipulation exceeds a predetermined number, reading out a head portion of the predetermined number of sequential signals other than a sequential signal stored in the first storing area of the buffer memory from the signal storing device for storage in the first storing area.

According to the specific construction, even if a skip manipulation is made the predetermined number of times or more, it is unnecessary to read out a head portion of a sequential signal selected by the manipulation from the signal storing device. This makes it possible to start reproducing the sequential signal without a reproduction waiting time.

As described above, according to the signal reproducing device of the present invention, when a signal selecting manipulation is made, a reproduction waiting time can be prevented before reproduction of a sequential signal selected by the manipulation.

BRIEF DESCRIPTION OF THE DRAWINGS

FIG. 10 is a flow chart showing a latter part of the procedure.

DETAILED DESCRIPTION OF THE INVENTION

A detailed description will be given below of the present invention embodied in a hard disk player 1 shown in FIG. 1 with reference to the drawings.

Figure 1:
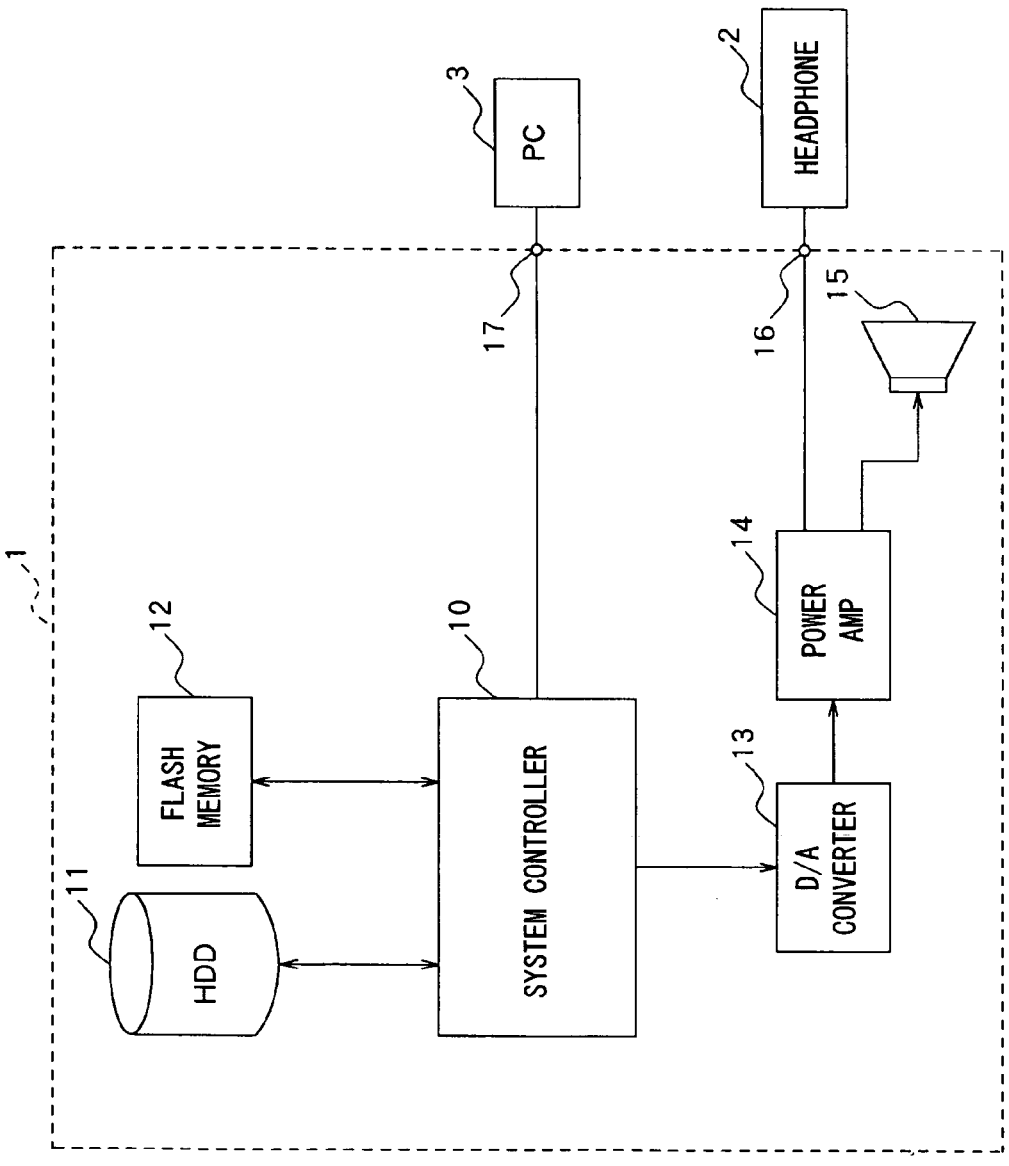
FIG. 1 is a block diagram showing a construction of a hard disk player embodying the present invention.

The hard disk player 1 shown in FIG. 1 includes a system controller 10. An HDD device 11 and a flash memory 12 are connected to the controller 10. A nonvolatile NAND-type flash memory, for example, is used for the flash memory 12.

The hard disk player 1 has an external input and output terminal 17. With the input and output terminal 17 and a personal computer 3 connected with a serial cable (not shown) such as a USB cable, the system controller 10 stores music data transferred from the computer 3 in the HDD device 11. Music data transferred via the network can also be stored in the HDD device 11. Furthermore, with a memory card loaded in a card slot (not shown), music data recorded in the card can also be stored in the HDD device 11.

The hard disk player 1 has also a speaker 15 and a headphone output terminal 16. The system controller 10 reads out music data stored in the HDD device 11 from the device 11 for temporary storage in the flash memory 12, and thereafter reads out the music data from the memory 12 to feed the data to a D/A converter 13. An analog voice signal obtained from the D/A converter 13 is, after fed to a power amp circuit 14 for amplification, fed to the speaker 15 or a headphone 2 connected to the headphone output terminal 16, and output from the speaker 15 or the headphone 2 as voice.

Figure 2:
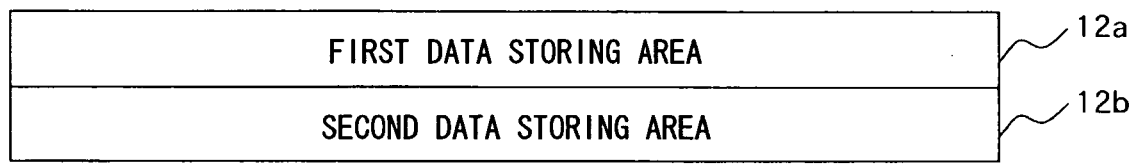
FIG. 2 shows a storing area of a flash memory of the hard disk player.

The flash memory 12 is concurrently provided with, as shown in FIG. 2, a first data storing area 12a for storing a head portion of music data for a plurality of tunes (hereinafter referred to as head data) and a second data storing area 12b for storing a remaining portion other than the head portion of music data for one tune (hereinafter referred to as remaining data). A data amount of head data is set such that a time for reading out the head data from the flash memory 12 is longer than a time for activating the HDD device 11 and reading out remaining data from the HDD device 11 for storage in the flash memory 12. The second data storing area 12b has a capacity of an extent that allows storage of music data for one tune.

In a description given below, music data is formatted by MP3 (MPEG-1 Audio Layer 3), and music data for one tune has a data amount of 5 MB. The flash memory 12 has a capacity of 32 MB, in which the first data storing area 12a has a capacity of 27 MB with that of the second data storing area 12b 5 MB. Head data of each tune is constituted of data for 20 seconds, and the first data storing area 12a of the flash memory 12 can store head data for 80 tunes.

Figure 3A:
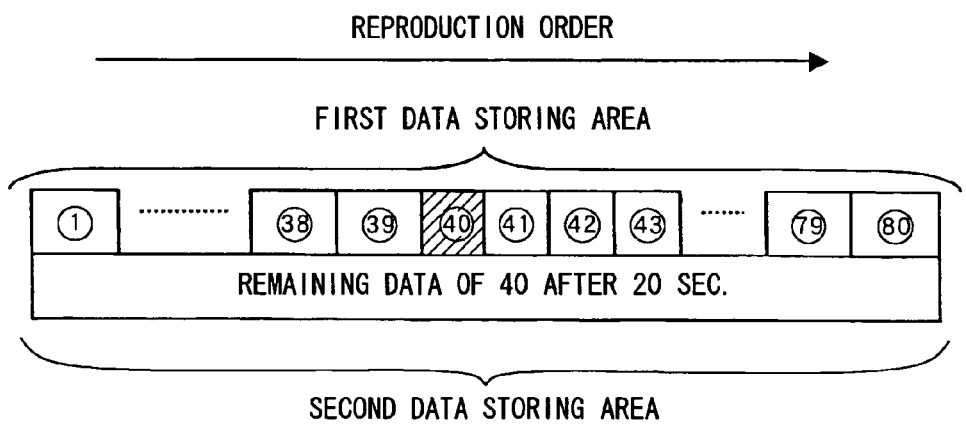
FIG. 3(a) to FIG. 3(c) show an example of changes in a data content in the flash memory during reproduction in the hard disk player.
Figure 3B:
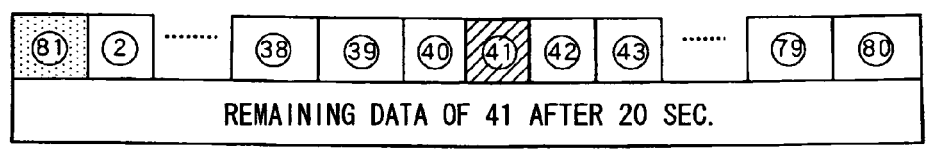
Figure 3C:
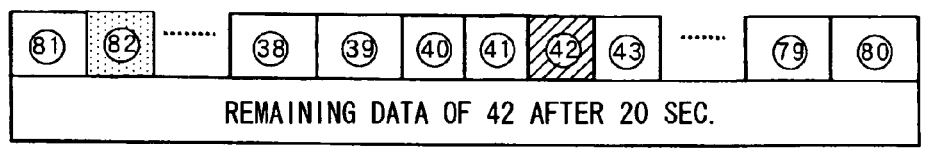

FIG. 3(a) to FIG. 3(c) show an example of changes in a data content in the flash memory 12 during reproduction of music data. As shown in FIG. 3(a), the first data storing area of the flash memory stores head data of music data 1-80 for 80 tunes including music data 40 of a 40th tune in the middle. Upon completion of reproduction of music data 39 of a 39th tune, an operation starts of reading out and reproducing head data 40 of the 40th tune from the first data storing area. During this operation, remaining data of the 39th tune, which has been reproduced before the data, is erased from the second data storing area, and thereafter remaining data 40 of the 40th tune, which is currently being reproduced, is stored in the area. Then, upon completion of reproduction of the head data 40, an operation subsequently starts of reading out and reproducing remaining data 40 of the 40th tune from the second data storing area. During this operation, head data 1 of a first tune, which is a tune with the earliest reproduction order stored in the first data storing area at the time, is erased from the first data storing area, and thereafter, as shown in FIG. 3(*b*), head data 81 of a 81st tune, which is a next tune to a tune with the latest reproduction order stored in the first data storing area at the time, is stored in the erased area.

Then, upon completion of reproduction of music data 40 of the 40th tune, an operation starts of reading out and reproducing head data 41 of a 41st tune from the first data storing area. During this operation, the remaining data of the 40th tune is erased from the second data storing area, and thereafter remaining data 41 of the 41st tune is stored in the area. Then, upon completion of reproduction of the head data 41, an operation subsequently starts of reading out and reproducing remaining data 41 of the 41st tune from the second data storing area. During this operation, head data 2 of a second tune is erased from the first data storing area, and thereafter, as shown in FIG. 3(*c*), head data 82 of a 82nd tune is stored in the erased area.

As described above, because the first data storing area of the flash memory 12 always stores head data of 80 tunes having a currently reproduced tune placed in the middle of order, upon completion of reproduction of music data, it is unnecessary to read out music data of a next tune from the HDD device 11 for storage in the flash memory 12. This makes it possible to start reproducing the music data without a reproduction waiting time. As described above, because a data amount of head data of each tune is set such that a time for reading out the head data from the flash memory 12 is longer than a time for reading out remaining data from the HDD device 11 for storage in the flash memory 12, storing operation of the remaining data into the flash memory 12 is completed at the time of completion of reproduction of the head data, which makes it possible to start reproducing the remaining data subsequently to the head data. Therefore, no silent period occurs during reproduction of music data of one tune.

Figure 4A:
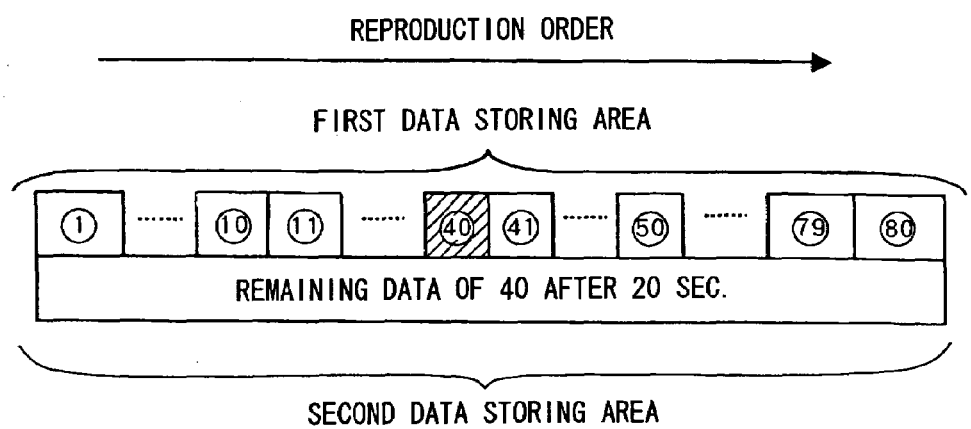
FIG. 4(a) and FIG. 4(b) show an example of changes in a data content in the flash memory in accordance with a skip manipulation.
Figure 4B:
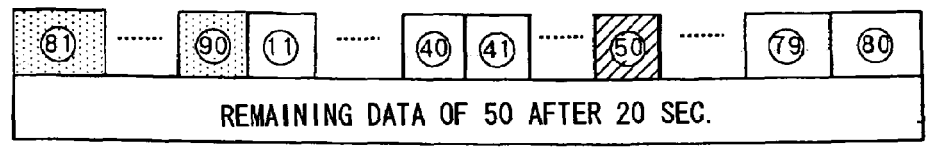

FIG. 4(*a*) and FIG. 4(*b*) show an example of changes in a data content in the flash memory 12 in accordance with a skip manipulation. When a skip manipulation is made ten times during reproduction of music data 40 of a 40th tune with head data 1-80 of first to 80th tunes stored in the first data storing area of the flash memory and remaining data 40 of the 40th tune stored in the second data storing area as shown in FIG. 4(*a*), an operation starts of reading out and reproducing head data 50 of a 50th tune, which is selected by the manipulation, from the first data storing area. During this operation, the remaining data of the 40th tune, which has been reproduced before the data, is erased from the second data storing area, and thereafter, as shown in FIG. 4(*b*), remaining data 50 of the 50th tune, which is currently being reproduced, is stored in the area. Then, upon completion of reproduction of the head data 50, an operation subsequently starts of reading out and reproducing remaining data 50 of the 50th tune from the second data storing area. During this operation, head data 1-10 of first to tenth tunes, which are excluded from 80 tunes having the currently reproduced 50th tune placed in the middle of order, is erased from the first data storing area, and thereafter head data 81-90 of 81st-90th tunes, which lie after a tune with the latest reproduction order stored in the first data storing area at the time, is stored in the erased area.

As described above, because the first data storing area of the flash memory 12 always stores head data of a great number of tunes of 80 tunes having a currently reproduced tune placed in the middle of order, when a skip manipulation is made by a user, head data of a tune selected by the manipulation is highly unlikely to fail to be stored in the first data storing area of the flash memory 12. When the head data is stored in the first data storing area, it is unnecessary to read out the head data from the HDD device 11 for storage in the flash memory 12. This makes it possible to start reproducing music data of a tune selected by a skip manipulation without a reproduction waiting time.

Figure 5:
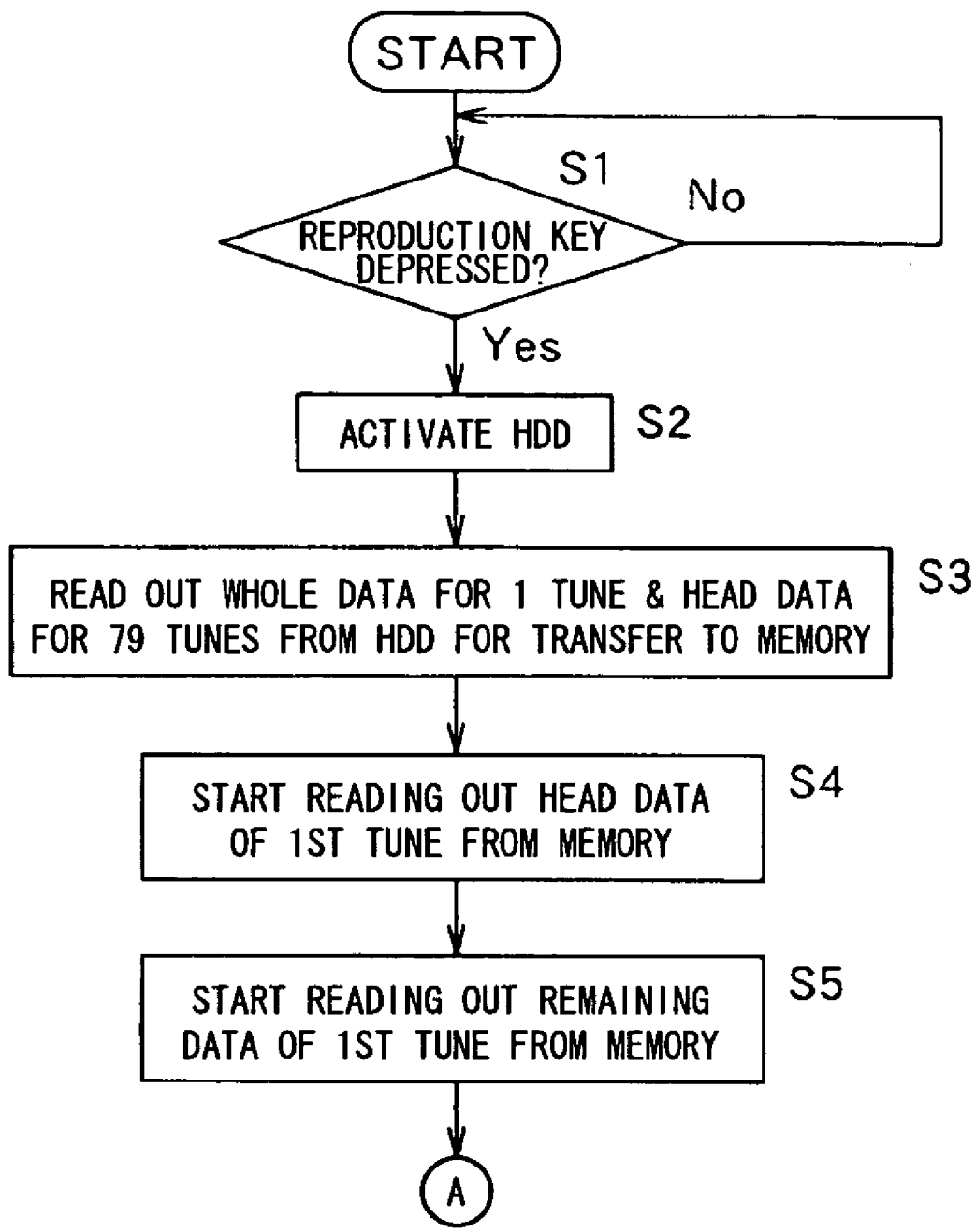
FIG. 5 is a flow chart showing a first part of a reproduction procedure to be performed in the hard disk player.
Figure 6:
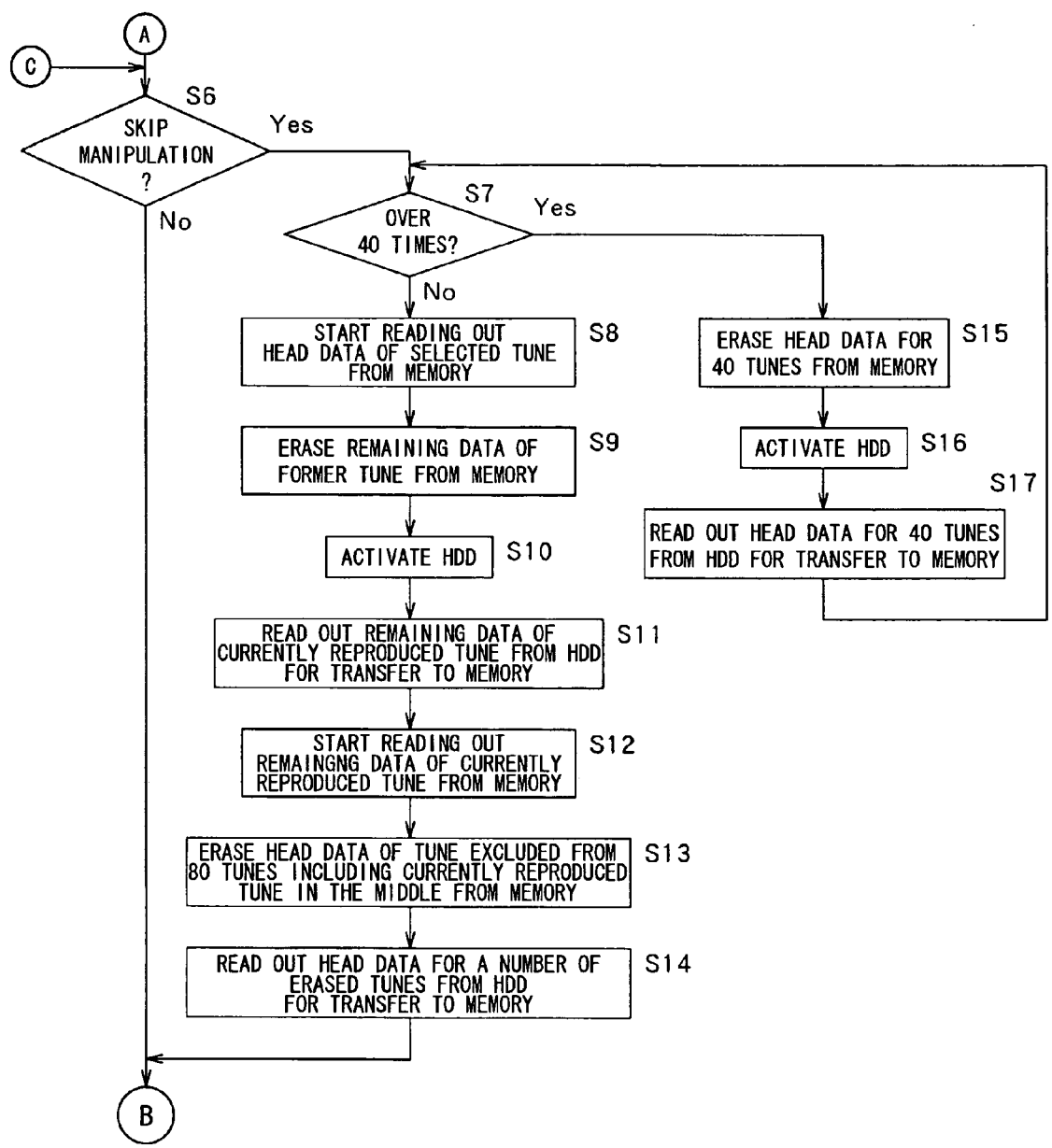
FIG. 6 is a flow chart showing a second part of the procedure.
Figure 7:
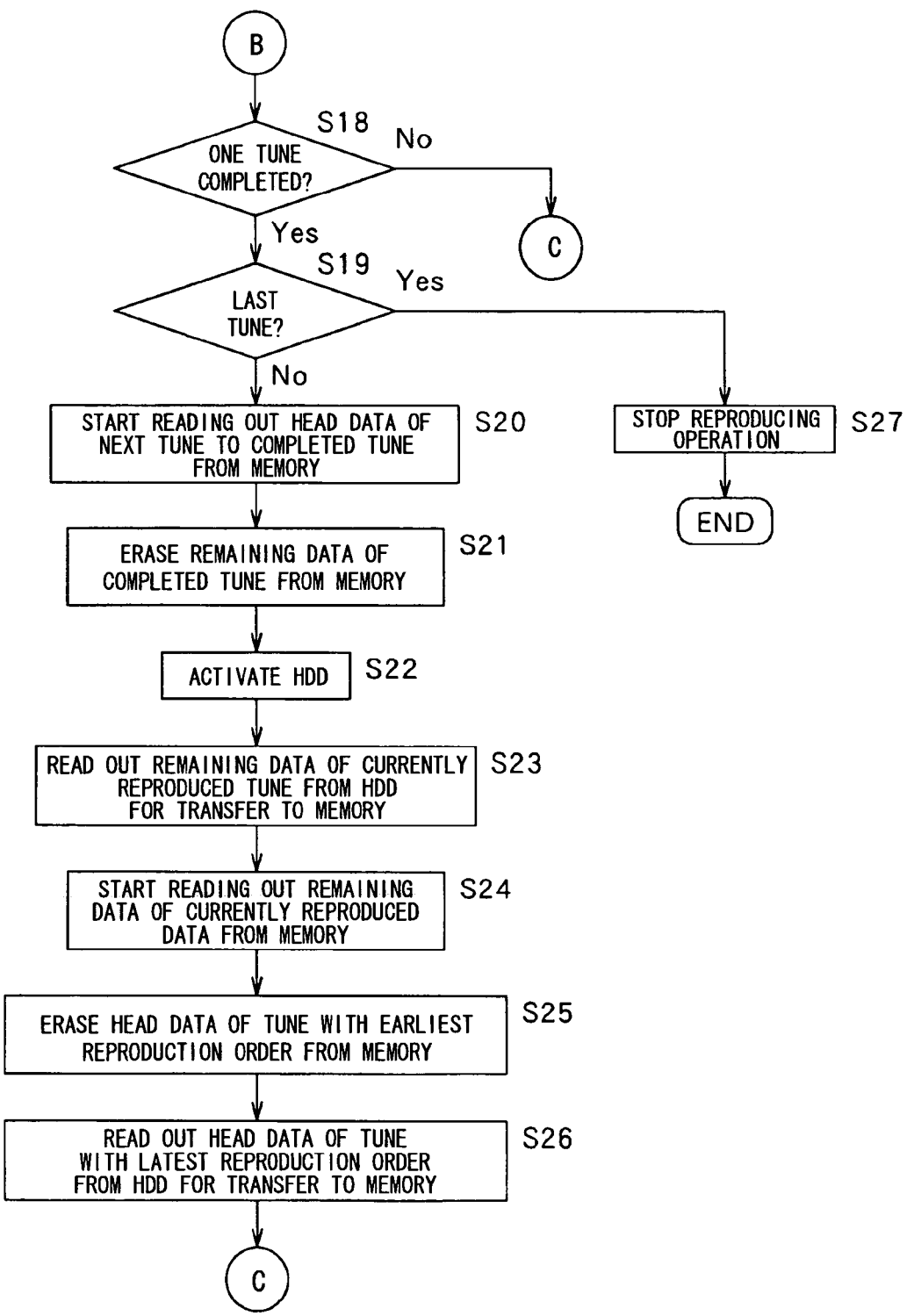
FIG. 7 is a flow chart showing a third part of the procedure.
Figure 8A:
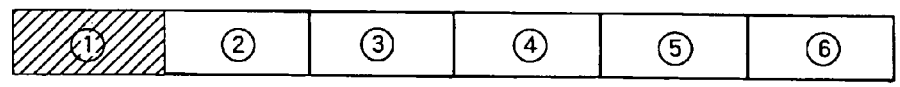
FIG. 8(a) to FIG. 8(c) show an example of changes in a data content in a flash memory during reproduction in a conventional hard disk player.
Figure 8A:
Figure 8B:
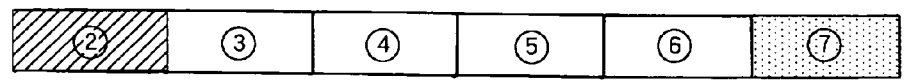
Figure 8B:
Figure 8C:
Figure 9:
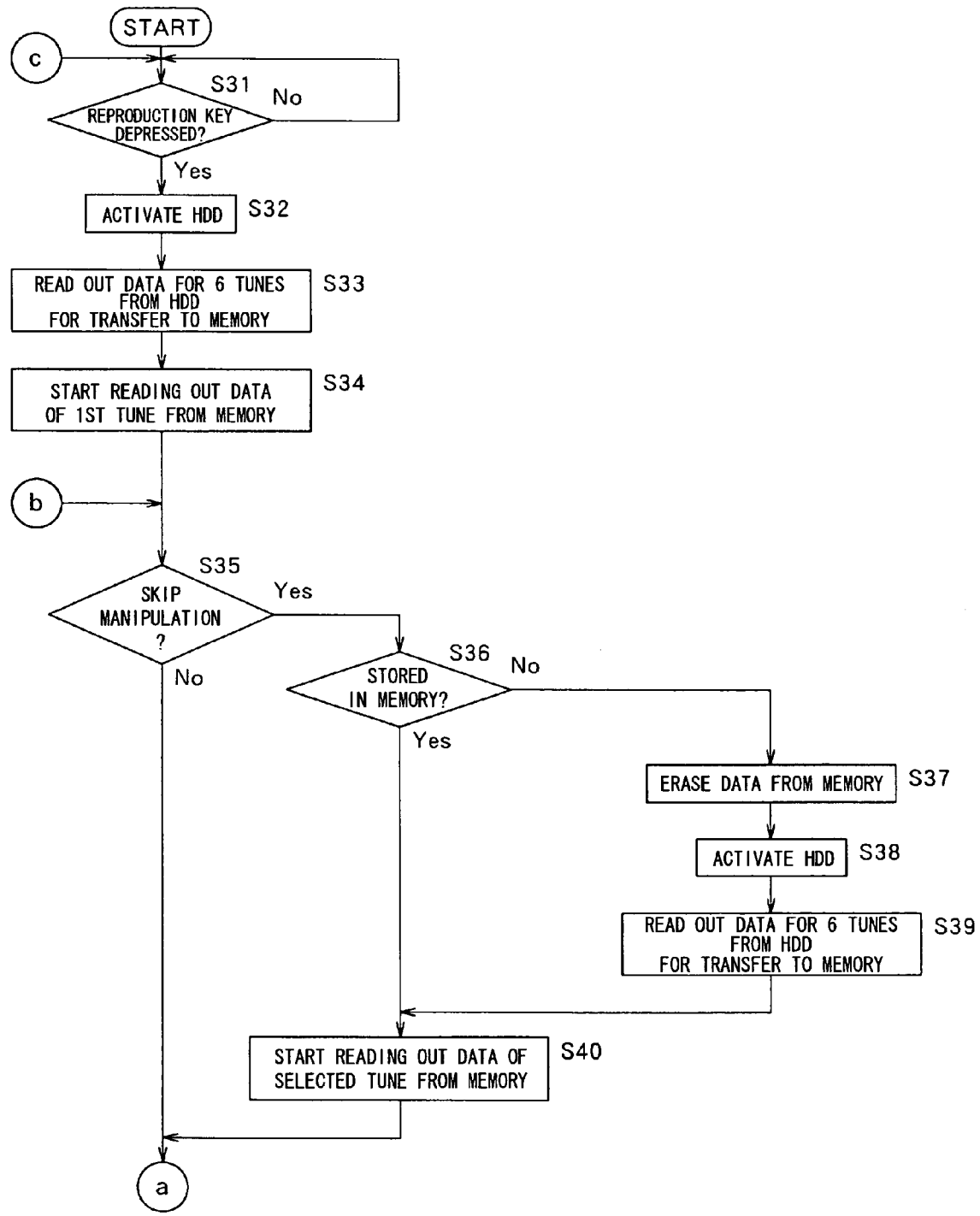
FIG. 9 is a flow chart showing a former part of a reproduction procedure to be performed in the hard disk player.

FIG. 5 to FIG. 7 show a reproduction procedure to be performed by the system controller 10. When the player is powered on, as shown in FIG. 5, an inquiry is made first in step S1 as to whether or not a reproduction key is depressed by a user. When the answer is negative, the same inquiry is repeated in step S1. On the other hand, when the reproduction key is depressed by the user and the answer to step S1 is affirmative, step S2 follows to activate the HDD device. Thereafter in step S3, whole data for one tune and head data for 79 tunes are read out from the HDD device and transferred to the flash memory. Here, the head data is stored in the first data storing area of the flash memory, while remaining data is stored in the second data storing area. Next in step S4, an operation starts of reading out and reproducing head data of a first tune from the first data storing area of the flash memory. Thereafter, upon completion of reproduction of the head data, an operation starts in step S5 of reading out and reproducing remaining data of the first tune from the second data storing area of the flash memory.

Subsequently in step S6 in FIG. 6, an inquiry is made as to whether or not a skip manipulation is made by the user. When the answer is negative, step S18 in FIG. 7 follows to inquire whether or not reproduction of music data for one tune is completed. When the answer is negative, step S6 in FIG. 6 follows again to inquire whether or not a skip manipulation is made.

Thereafter when reproduction of music data for one tune is completed, the answer to step S18 in FIG. 7 is affirmative, and step S19 follows to inquire whether or not the reproduction completed tune is a last tune stored in the HDD device.

When the reproduction completed tune is not a last tune stored in the HDD device, step S20 follows to start an operation of reading out head data of a next tune to the reproduction completed tune from the first data storing area of the flash memory. Subsequently in step S21, remaining data of the reproduction completed tune is erased from the second data storing area of the flash memory. Thereafter in step S22, the HDD device is activated from a standby state. Next in step S23, remaining data of a currently reproduced tune is read out from the HDD device and transferred to the flash memory. Here, the remaining data is stored in the second data storing area of the flash memory.

Thereafter, upon completion of reproduction of head data of the currently reproduced tune, an operation starts in step S24 of reading out and reproducing the remaining data of the tune from the second data storing area of the flash memory. Subsequently in step S25, head data of a tune with the earliest reproduction order is erased from the first data storing area of the flash memory. Thereafter in step S26, head data of a next tune to a tune with the latest reproduction order stored in the first data storing area of the flash memory is read out from the HDD device and transferred to the flash memory. Here, the head data is stored in the first data storing area of the flash memory. Then step S6 in FIG. 6 follows again to inquire whether or not a skip manipulation is made.

When a skip manipulation is made by the user with music data being reproduced as described above, the answer to step S6 is affirmative, and step S7 follows to inquire whether or not the number of times of the skip manipulation exceeds 40. When the answer is negative, step S8 follows to start an operation of reading out and reproducing head data of a tune selected by the skip manipulation from the first data storing area of the flash memory. Subsequently in step S9, remaining data of a tune reproduced before the tune is erased from the second data storing area of the flash memory. Thereafter in step S10, the HDD device is activated from a standby state. Next in step S11, remaining data of a currently reproduced tune is read out from the HDD device and transferred to the flash memory. Here, the remaining data is stored in the second data storing area of the flash memory. Thereafter, upon completion of reproduction of head data of the currently reproduced tune, an operation starts in step S12 of reading out and reproducing the remaining data of the tune from the second data storing area of the flash memory. Subsequently in step S13, head data of a tune excluded from 80 tunes having the currently reproduced tune placed in the middle of order is erased from the first data storing area of the flash memory. Next in step S14, head data of a tune not stored in the flash memory among the 80 tunes having the currently reproduced tune in the middle of order is read out from the HDD device and transferred to the flash memory. Here, these pieces of head data are stored in the first data storing area of the flash memory. Next, step S18 in FIG. 7 follows to inquire whether or not reproduction of music data for one tune is completed.

When the number of times of a skip manipulation exceeds 40 during skip manipulations, the answer to step S7 in FIG. 6 is affirmative, and step S15 follows to erase head data for 40 tunes from the first data storing area of the flash memory. Thereafter in step S16, the HDD device is activated from a standby state. Next in step S17, head data for 40 tunes other than head data stored in the first data storing area of the flash memory is read out from the HDD device and transferred to the flash memory. Thereafter, step S7 follows again to repeat the inquiry as to whether or not the number of times of a skip manipulation exceeds 40.

Thereafter when reproduction of music data of a last tune stored in the HDD device is completed, the answer to step S19 in FIG. 7 is affirmative, and step S27 follows to stop reproducing operation. Then step S1 in FIG. 5 follows again to wait for the reproduction key to be depressed.

In the hard disk player 1 of the present invention, as described above, when a skip manipulation is made, it is possible to start reproducing music data of a tune selected by the manipulation without a reproduction waiting time.

Moreover, as shown in FIG. 3(a), because the first data storing area of the flash memory 12 stores not only head data of a tune with a reproduction order later than that of a currently reproduced tune, but also that of a tune with an earlier reproduction order, even if a manipulation is made by a user for selecting an already reproduced tune, it is unnecessary to read out head data of the selected tune from the HDD device. This makes it possible to start reproducing music data of the tune without a reproduction waiting time.

Furthermore, because head data for 40 tunes other than head data stored in the first data storing area of the flash memory is read out from the HDD device and stored in the first data storing area whenever the number of times of a skip manipulation exceeds 40, even if a skip manipulation is made 40 times or more, it is unnecessary to read out head data of a tune selected by the manipulation from the HDD device. This makes it possible to start reproducing music data of the tune without a reproduction waiting time.

In the above embodiment used as a buffer memory is the flash memory 12, but is not limited to this, other known volatile or nonvolatile semiconductor memory may be used.

What is claimed is:
1. A signal reproducing device comprising:
a signal storing device for storing a plurality of sequential signals, respective sequential signals representing a single tune, and the respective sequential signals representing a single tune including a head portion and a remaining portion other than the head portion;
a buffer memory for storing sequential signals read out from the signal storing device;
a signal processing circuit for reading out a sequential signal stored in the signal storing device for temporary storage in the buffer memory, and thereafter reading out and reproducing the sequential signal from the buffer memory,
the buffer memory being concurrently provided with a first storing area for storing respective head portions of a plurality of the sequential signals and a second storing area for storing a remaining portion other than the head portion of at least one sequential signal representing a single tune, wherein the first storing area stores a number of the respective head portions of the sequential signals that is greater than a number of remaining portions other than the head portion of the at least one sequential signal stored in the second storing area,
wherein when a signal selecting manipulation is made with the respective head portions of the plurality of sequential signals stored in the first storing area of the buffer memory, the signal processing circuit reads out and reproduces a head portion of a selected sequential signal from the first storing area; and
during reading out and reproducing the head portion of the selected sequential signal from the first storing area of the buffer memory, the signal processing circuit reads out a remaining portion other than the head portion of the selected sequential signal from the signal storing device for storage in the second storing area of the buffer memory, and while the head portion of the selected sequential signal is being read out and reproduced from the first storing area of the buffer memory, only the remaining portion of the selected sequential signal is stored in the second storing area of the buffer memory; and
after completion of the operation of reading out and reproducing the head portion of the selected sequential signal from the first storing area, the signal processing circuit reads out and reproduces the remaining portion of the selected sequential signal from the second storing area of the buffer memory.

2. The signal reproducing device according to claim 1, wherein the first storing area of the buffer memory stores a head portion of one or more sequential signals with a reproduction order earlier than that of a currently reproduced sequential signal, and a head portion of one or more sequential signals with a later reproduction order.

3. The signal reproducing device according to claim 1, wherein during reading out and reproducing the remaining portion of the selected sequential signal from the second storing area of the buffer memory, the signal processing circuit reads out a head portion of one or more sequential signals other than sequential signals stored in the first storing area of the buffer memory from the signal storing device in accordance with the selected sequential signal for storage in the first storing area.

4. The signal reproducing device according to the claim 1, wherein upon completion of reproduction of one sequential signal, the signal processing circuit reads out and reproduces a head portion of one sequential signal with a reproduction order later than that of the completed sequential signal from the first storing area of the buffer memory; and during reading out and reproducing the head portion of the one sequential signal with the later reproduction order from the first storing area, the signal processing circuit reads out a remaining portion other than the head portion of the one sequential signal with the later reproduction order from the signal storing device for storage in the second storing area of the buffer memory; and after completion of the operation of reading out and reproducing the head portion of the one sequential signal with the later reproduction order from the first storing area, the signal processing circuit reads out and reproduces the remaining portion of the one sequential signal with the later reproduction order from the second storing area of the buffer memory; and during reading out and reproducing the remaining portion of the one sequential signal with the later reproduction order from the second storing area, the signal processing circuit reads out a head portion of one sequential signal with a reproduction order later than that of sequential signals stored in the first storing area of the buffer memory from the signal storing device for storage in the first storing area.

5. The signal reproducing device according to claim 1, wherein a skip reproduction is possible in which reproduction is made skipping a sequential signal from a currently reproduced sequential signal by a number in accordance with the number of times of a skip manipulation, and whenever the number of times of a skip manipulation exceeds a predetermined number, the signal processing circuit reads out a head portion of the predetermined number of sequential signals other than sequential signals stored in the first storing area of the buffer memory from the signal storing device for storage in the first storing area.

6. A method for making a signal reproducing device conduct signal reproducing operation, the signal reproducing device comprising a signal storing device for storing a plurality of sequential signals, and a buffer memory for storing sequential signals read out from the signal storing device, respective sequential signals representing a single tune, and the respective sequential signals representing a single tune including a head portion and a remaining portion other than the head portion, the buffer memory being concurrently provided with a first storing area for storing respective head portions of a plurality of the sequential signals and a second storing area for storing a remaining portion other than the head portion of at least one sequential signal representing a single tune, the method comprising the steps of:

storing in the first storing area of the buffer memory a number of the respective head portions of the plurality of the sequential signals that is greater than a number of remaining portions other than the head portion of the at least one sequential signal stored in the second storing area;

reading out and reproducing a head portion of a selected sequential signal from the first storing area when a signal selecting manipulation is made with the respective head portions of the plurality of sequential signals stored in the first storing area of the buffer memory;

reading out a remaining portion other than the head portion of the selected sequential signal from the signal storing device for storage in the second storing area of the buffer memory during reading out and reproducing the head portion of the selected sequential signal from the first storing area, and while the head portion of the selected sequential signal is being read out and reproduced from the first storing area of the buffer memory, only the remaining portion of the selected sequential signal is stored in the second storing area of the buffer memory; and reading out and reproducing the remaining portion of the selected sequential signal from the second storing area of the buffer memory after completion of the operation of reading out and reproducing the head portion of the selected sequential signal from the first storing area.

\* \* \* \* \*